US009713867B2

(12) United States Patent
Yang et al.

(10) Patent No.: US 9,713,867 B2
(45) Date of Patent: Jul. 25, 2017

(54) NAIL MAGAZINE FOR NAILING GUN

(71) Applicant: Taizhou Dajiang Ind. Co., Ltd, Zhejiang Province (CN)

(72) Inventors: Ming-Jun Yang, Zhejiang Province (CN); Zai-Jun Zhu, Zhejiang Province (CN)

(73) Assignee: TAIZHOU DAJIANG IND. CO., LTD, Zhejiang Province (CN)

(*) Notice: Subject to any disclaimer, the term of this patent is extended or adjusted under 35 U.S.C. 154(b) by 425 days.

(21) Appl. No.: 14/467,972

(22) Filed: Aug. 25, 2014

(65) Prior Publication Data

US 2016/0001431 A1 Jan. 7, 2016

(30) Foreign Application Priority Data

Jul. 1, 2014 (CN) ..................... 2014 2 0362926 U

(51) Int. Cl.

| | |
|---|---|
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |
| ***E21B 1/00*** | (2006.01) |
| ***B25C 1/00*** | (2006.01) |

(52) U.S. Cl.

CPC .................................... *B25C 1/005* (2013.01)

(58) Field of Classification Search

CPC ........... B25C 1/005; B25C 1/001; B25C 1/00; B25C 5/1606; B25C 5/1651

USPC ..... 173/118–120, 213; 227/109, 119–139, 8, 227/156

See application file for complete search history.

(56) References Cited

U.S. PATENT DOCUMENTS

| | | | | |
|---|---|---|---|---|
| 633,242 A * | 9/1899 | Hayes | F16B 15/0015 | 411/475 |
| 2,428,259 A * | 9/1947 | Anstett | F16B 15/08 | 411/443 |
| 2,867,807 A * | 1/1959 | Anstett | F16B 15/0015 | 206/340 |
| 3,908,884 A * | 9/1975 | Schrepferman | B25C 1/005 | 227/120 |
| 3,980,179 A * | 9/1976 | Schrepferman | B25C 1/005 | 206/338 |
| 4,011,785 A * | 3/1977 | Schrepferman | B25C 1/005 | 206/343 |

(Continued)

*Primary Examiner* — Robert Long

(74) *Attorney, Agent, or Firm* — Tim Tingkang Xia, Esq.; Locke Lord LLP

(57) ABSTRACT

The present invention relates to a versatile nail magazine for a nailing gun. In certain embodiments, the versatile nail magazine includes an elongated nail magazine body for loading nails. The nail magazine body includes: a front end connected to a nailing head of the nailing gun, and a rear end for reloading various types of nails, a nail shank track having a lower end, and an upper end, a nail head track disposed on the upper end of the nail shank track, and one or more nail head positioning protrusions disposed between the upper end of the nail shank track and the nail head track for securing the plurality of nails. The nail shank track, and the nail head track extend lengthwise along nail magazine body. Nails in a nail strip are loaded in the nail head track, and the nail shank track from rear end of nail magazine body.

10 Claims, 6 Drawing Sheets

(56) References Cited

U.S. PATENT DOCUMENTS

| | | | | | |
|---|---|---|---|---|---|
| 4,049,181 | A * | 9/1977 | Kametaki | B25C 1/005 | 227/113 |
| 4,558,811 | A * | 12/1985 | Klaus | B25C 1/005 | 227/116 |
| 5,615,819 | A * | 4/1997 | Hou | B25C 5/1651 | 227/109 |
| 5,615,985 | A * | 4/1997 | Rose | F16B 15/08 | 411/442 |
| 5,632,431 | A * | 5/1997 | Lin | B25C 1/005 | 227/109 |
| 5,641,110 | A * | 6/1997 | Yang | B25C 1/005 | 227/109 |
| 5,695,108 | A * | 12/1997 | Lee | B25C 5/1644 | 227/109 |
| 5,971,688 | A * | 10/1999 | Anstett | B25C 1/00 | 411/442 |
| 6,659,700 | B1 * | 12/2003 | Farrell | F16B 15/06 | 411/450 |
| 7,048,169 | B2 * | 5/2006 | Sun | B25C 5/1651 | 227/109 |
| 7,815,087 | B2 * | 10/2010 | Jian | B25C 1/005 | 227/119 |
| 9,121,427 | B2 * | 9/2015 | Young | F16B 15/0015 | |
| 2002/0060233 | A1 * | 5/2002 | Akiba | B25C 1/005 | 227/109 |
| 2003/0201299 | A1 * | 10/2003 | Chen | B25C 1/005 | 227/109 |
| 2004/0084499 | A1 * | 5/2004 | Tsai | B25C 1/005 | 227/109 |
| 2004/0084500 | A1 * | 5/2004 | Beville | B25C 1/005 | 227/109 |
| 2004/0211810 | A1 * | 10/2004 | Ho | B25C 1/005 | 227/120 |
| 2005/0017047 | A1 * | 1/2005 | Yao | B25C 1/005 | 227/109 |
| 2005/0121488 | A1 * | 6/2005 | Sun | B25C 5/1651 | 227/109 |
| 2005/0211745 | A1 * | 9/2005 | Ishizawa | B25C 1/001 | 227/120 |
| 2007/0164075 | A1 * | 7/2007 | Chen | B25C 1/184 | 227/119 |
| 2007/0246502 | A1 * | 10/2007 | Liu | B25C 5/161 | 227/120 |
| 2008/0067089 | A1 * | 3/2008 | Zhu | B25C 5/1651 | 206/340 |
| 2008/0264999 | A1 * | 10/2008 | Lee | B25C 5/1658 | 227/109 |
| 2008/0296340 | A1 * | 12/2008 | Wang | B25C 5/1651 | 227/109 |
| 2009/0026244 | A1 * | 1/2009 | Huang | B25C 1/005 | 227/119 |
| 2009/0050667 | A1 * | 2/2009 | Po | B25C 5/1658 | 227/120 |
| 2010/0127035 | A1 * | 5/2010 | Wu | B25C 1/001 | 227/125 |
| 2010/0230463 | A1 * | 9/2010 | Yang | B25C 1/005 | 227/109 |
| 2011/0114695 | A1 * | 5/2011 | Yang | B25C 1/005 | 227/109 |
| 2014/0331474 | A1 * | 11/2014 | Walters, Jr. | B25C 1/005 | 29/432 |

* cited by examiner

NAIL MAGAZINE FOR NAILING GUN

CROSS-REFERENCE TO RELATED APPLICATION

This application claims the priority to Chinese Patent Application No. 201420362926.0, filed on Jul. 1, 2014, in the State Intellectual Property Office of P.R. China, which is hereby incorporated herein in its entirety by reference.

FIELD

The present invention mainly relates to the field of nail driving tool, and more particularly to embodiments of versatile nail magazine for nailing guns.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

It is well known that there are many different types of nails for fastening different type of wood panels. They differ in shape, type, length and gauge. The nail shapes include at least: a T shaped nail, and L shaped cleat, and a U shaped staple. The cross-section of the nail shank can be: round, square, or rectangular. The length ranges from 1 to 4 inches for different thickness of the wood panels. The head can have round shape, clipped head, and notched head. The shank of the nail may be smooth, ring-shank, screw shank, or combination thereof. They can also be pin/brad nails, and finish nails. They also differ in gauge size. The gauge of a nail is a measurement of the diameter of the shank. The higher the gauge is, the smaller the diameter of the shank is. For example, a 16 gauge ring shank nail has a diameter of 0.0625 inch, while an 18 gauge ring shank nail has a diameter of only 0.0475 inch. In general, lower gauge nails (thicker nails) are stronger than thinner nails. The thicker the nail is, the easier the wood panel splits. Gauge 16 and gauge 18 nails or cleats are frequently used for most wood panels. These nails are often formed into strips for continuous/magazine feeding to be used for nailing guns. Due to the various type, shape, gauge and length, a conventional nailing gun has a specific nail magazine to supply a specific type of nail. It is therefore desirable to have a more versatile nail magazine for a nailing gun that can accommodate many types of nails, each having different shape, head type, length and gauge size.

Therefore, heretofore unaddressed needs exist in the art to address the aforementioned deficiencies and inadequacies.

SUMMARY

In one aspect, the present invention relates to a versatile nail magazine for a nailing gun. In certain embodiments, the versatile nail magazine includes an elongated nail magazine body for loading various types of nails. The nail magazine body includes: a front end, an opposite, rear end, a nail shank track, a nail head track, and one or more nail head positioning protrusions. The front end of the nail magazine body is connected to a nailing head of the nailing gun. The rear end of the nail magazine body is used to load/reload various types of nails. The nail shank track has a lower end, and an opposite, upper end. The nail head track is positioned on the upper end of the nail shank track.

In certain embodiments, the nail head track has a rectangular shaped cross section, and substantially perpendicular to the nail shank track. The nail shank track is connected to the nail head track through the nail head positioning protrusions. The nail head positioning protrusions are disposed between the upper end of the nail shank track and the nail head track for securing the plurality of nails. The nail shank track, and the nail head track both extend lengthwise along the elongated nail magazine body. In one embodiment, the connected nail shank track and the first nail head track forms a T shaped cross sectional space for accommodating T shaped nails. In another embodiment, the connected nail shank track and the nail head track forms an L shaped cross sectional space for accommodating L shaped cleats.

In certain embodiments, the nail head positioning protrusions are positioned on both sides of the nail shank track for securing the positions of the nails. In one embodiment, the nail head positioning protrusions have rounded edge. The nails used by the embodiments of the present invention include at least: a T shaped nail, and an L shaped cleat in different gauges.

In certain embodiments, the nail magazine body also includes an upper nail pushing block groove, and a lower nail pushing block groove for accommodating a nail pushing block. Both the upper nail pushing block groove and the lower nail pushing block groove form a nail pushing block track which is parallel to the nail shank track and extends along the lengthwise direction of the nail magazine body.

In another aspect, the present invention relates to another versatile nail magazine for a nailing gun. In certain embodiments, the versatile nail magazine includes an elongated nail magazine body for loading various types of nails. The nail magazine body includes: a front end, an opposite, rear end, a nail shank track, a first nail head track, a second nail head track, and one or more nail head positioning protrusions. The front end of the nail magazine body is connected to a nailing head of the nailing gun. The rear end of the nail magazine body is used to load/reload various types of nails. The nail shank track has a lower end, and an opposite, upper end. The first nail head track is positioned on the upper end of the nail shank track. The second nail head track is positioned above the first nail head track and connected to the first nail head track.

In certain embodiments, the first nail head track has a rectangular shaped cross section, and substantially perpendicular to the nail shank track. The second nail head track has an L shaped cross section, and one end of the second nail head track is substantially perpendicular to the nail shank track, and the other end of the second nail head track is substantially parallel to the nail shank track. The nail shank track is connected to the first nail head track through the nail head positioning protrusions, and further connected to the second nail head track. The nail head positioning protrusions are disposed between the upper end of the nail shank track and the first nail head track for securing the plurality of nails. The nail shank track, the first nail head track, and the second nail head track extend lengthwise along the elongated nail magazine body.

In one embodiment, the connected nail shank track and the first nail head track forms a T shaped cross sectional space for accommodating T shaped nails. In another embodiment, the connected nail shank track and the first nail head track forms an L shaped cross sectional space for accommodating short L shaped cleats, and the connected nail shank track and the second nail head track forms another L shaped cross sectional space for accommodating long L shaped cleats.

In certain embodiments, the nail head positioning protrusions are positioned on both sides of the nail shank track for securing the positions of the nails. In one embodiment, the nail head positioning protrusions have rounded edge. The nails used by the embodiments of the present invention include at least: a T shaped nail, and an L shaped cleat in different gauges and different lengths.

In certain embodiments, the nail magazine body also includes an upper nail pushing block groove, and a lower nail pushing block groove for accommodating a nail pushing block. Both the upper nail pushing block groove and the lower nail pushing block groove form a nail pushing block track which is parallel to the nail shank track and extends along the lengthwise direction of the nail magazine body.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention, and wherein.

DETAILED DESCRIPTION

Figure 1:
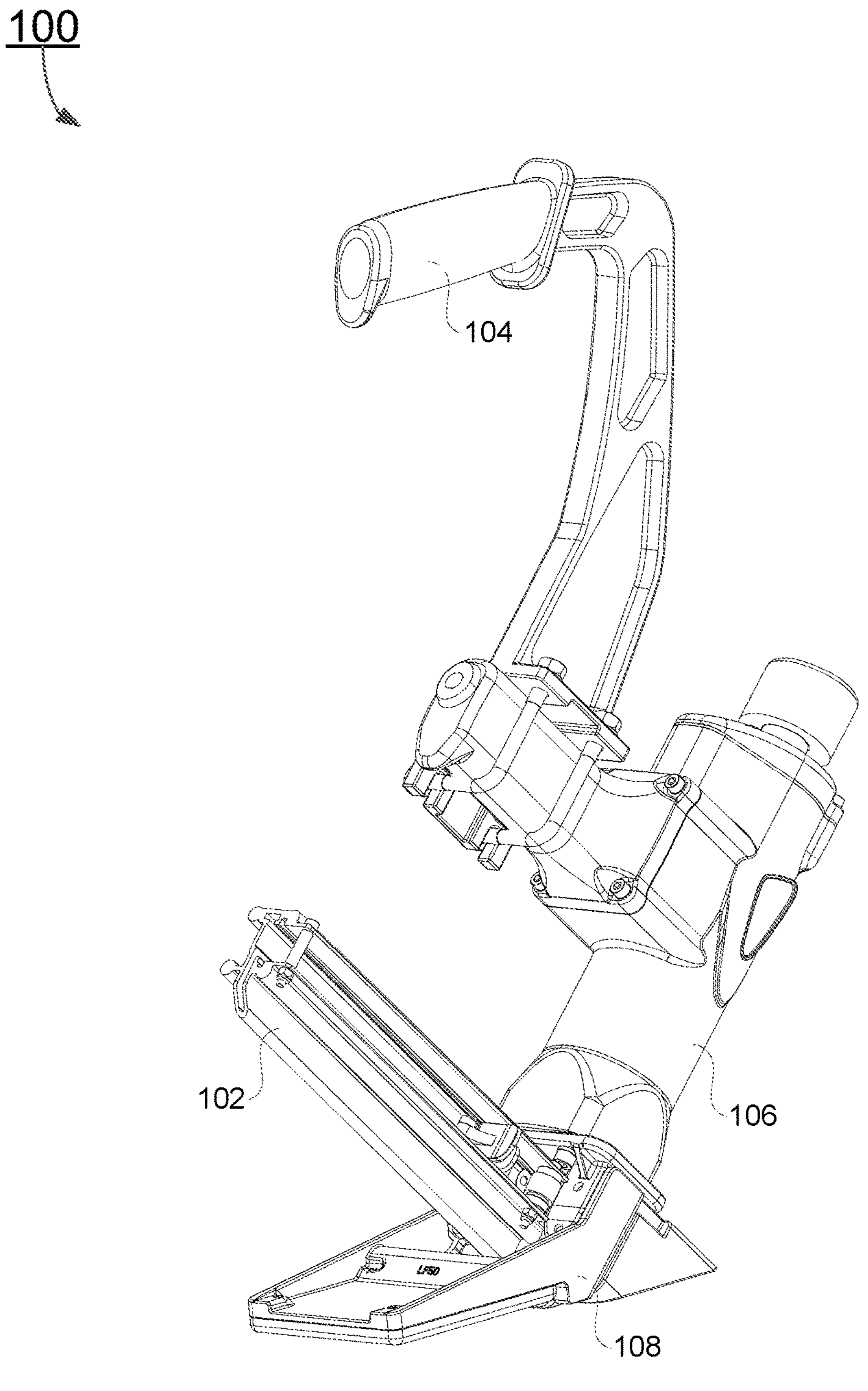
FIG. 1 is a perspective view of a nailing gun having a versatile nail magazine according to certain embodiments of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

Many specific details are provided in the following descriptions to make the present invention be fully understood, but the present invention may also be implemented by using other manners different from those described herein, so that the present invention is not limited by the specific embodiments disclosed in the following.

The description will be made as to the embodiments of the present invention in conjunction with the accompanying drawings FIGS. 1-4. In accordance with the purposes of this invention, as embodied and broadly described herein, this invention, in one aspect, relates to a versatile nail magazine 102 for a nailing gun 100.

Referring now to FIG. 1, a perspective view of a nailing gun 100 is shown according to certain embodiments of the present invention. In certain embodiment, the nailing gun 100 includes: a versatile nail magazine 102, a nailing gun handle 104, a nailing head 106, and a positioning device 108. The versatile nail magazine 102 is used to load and supply various types of nails. The nails are usually provided to the nailing gun in a strip. In one embodiment, the nail strip is formed by gluing them side by side. In another embodiment, the nail strip is paper taped together. The versatile nail magazine 102 may also include a nail pushing block to automatically push the nails forward as the nails are used. In certain embodiments, the nail pushing block is pushed by a spring. The nailing gun handle 104 is used by an operator to move the nailing gun 100. The positioning device 108 is used by the operator to position the nailing gun 100 at an appropriate location where one or more nails are needed.

In certain embodiments, the versatile nail magazine 102 has a front end and an opposite, rear end. The front end of the versatile nail magazine 102 is connected to the nailing head 106 to supply the nails in the versatile nail magazine 102. The nailing head 106 is used to drive a nail at the front of the nail strip supplied by the versatile nail magazine 102 into the wood panels. After each nail is nailed into a wood panel, the nail pushing block pushes the nail strip forward such that the first nail in pushed to the nailing position to be used/nailed next. The nailing head 106 has a driving pin to drive the nail in nailing position to the wood panel. In one embodiment, the driving pin is driven by automatic driving device. In another embodiment, the driving pin is driven by a manual driving device. The automatic driving device is actuated by a pneumatic driving device, a hydraulic driving device, or an electrical driving device. The manual driving device is driven by a manual tool such as a hammer or a mallet.

Figure 2:
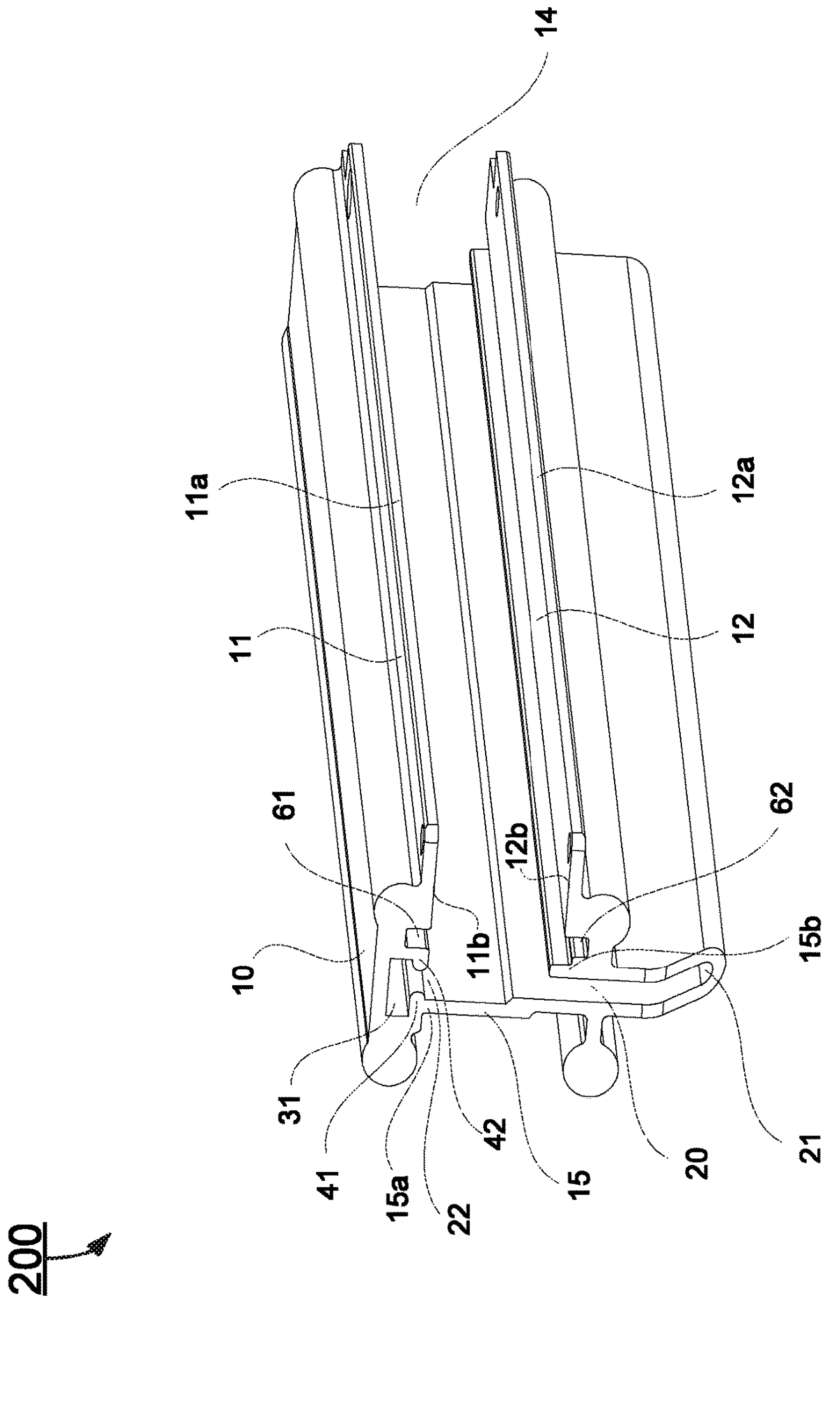
FIG. 2 is a partial perspective cross sectional view of the versatile nail magazine for the nailing gun according to one embodiment of the present invention.

The nail magazine 102 has an elongated nail magazine body 200 for loading nails in a nail strip. A partial perspective cross sectional view of the nail magazine body 200 is shown in FIG. 2 and a cross sectional view of the nail magazine body 200 is shown in FIG. 3A, according to one embodiment of the present invention. The nail magazine body 200 includes: a front end, an opposite, rear end. The front end of the nail magazine body 200 is connected to a nailing head 106 of the nailing gun 100 as shown in FIG. 1. The rear end of the nail magazine body 200 is used to load/reload various types of nails. The nail magazine body 200 also includes a top portion 10 having a nail head track 31 defined therein and a first flange 11 extending widthwise from the nail head track 20, a sidewall 15 having a first end 15*a* and a second end 15*b* and extending vertically from the top portion 10 in a cross-sectional U-like shape to define a nail shank track 20 having a lower end 21, and an opposite, upper end 22, and a second flange 12 extending widthwise from the second end 15*b* of the sidewall 15 such that the first flange 11 and the second flange 12 define an opening 14 therebetween to communicate with the nail shank track and the nail head track 31. The opening 14 is adapted for accommodating the nail pushing block as shown in FIG. 1. The first flange 11 has a widthwise edge 11*a* and an inner surface 11*b* facing the opening 14, and the second flange 12 has a widthwise edge 12*a* and an inner surface 12*b* facing the opening 14. The widthwise edges 11*a* and 12*a* of the first flange 11 and the second flange 12 are vertically aligned with each other. The inner surfaces 11*b* and 12*b* of the first flange 11 and the second flange 12 are parallel to each other and perpendicular to the nail shank track 20. In addition, the nail magazine body 200 also includes one or more nail head positioning protrusions 41 and 42 disposed in the top portion 10 and between the upper end 22 of the nail shank track 20 and the nail head track 31 for securing the plurality of nails.

In certain embodiments, the nail shank track 20 has the lower end 21 located at a bottom of the cross-sectional U-like shape of the sidewall 15, and the upper end 22 located at the nail head track 31 and the first end 15*a* of the sidewall 15. The nail head track 31 is positioned on the upper end 22 of the nail shank track 20.

In certain embodiments, the nail head track 31 has a rectangular shaped cross section. The nail head track 31 is substantially perpendicular to the nail shank track 20 to accommodate both T shaped nails, and L shaped cleats. The nail shank track 20 is connected to the nail head track 31 through the nail head positioning protrusions 41, and 42. The nail head positioning protrusions 41, and 42 are disposed between the upper end 22 of the nail shank track 20 and the nail head track 31 for securing the nails. The nail shank track 20, and the nail head track 31 both extend lengthwise along the elongated nail magazine body 200. In one embodiment, the connected nail shank track 20 and the first nail head track 31 forms a T shaped cross sectional space for accommodating T shaped nails. In another embodiment, the connected nail shank track 20 and the nail head track 31 forms an L shaped cross sectional space for accommodating L shaped cleats.

The nail head positioning protrusions 41, and 42 are positioned on both sides of the nail shank track 20 for securing the positions of the nails. In one embodiment, the nail head positioning protrusions 41, and 42 have rounded edge. The nails used by the embodiments of the versatile nail magazine 102 include at least: a T shaped nail, and an L shaped cleat in different gauges and lengths.

In certain embodiments, the nail magazine body 200 also includes an upper nail pushing block groove 61 defined in the first flange 11 and facing the opening 14, a lower nail pushing block groove 62 defined in the second flange 12 and facing the opening 14 for accommodating a nail pushing block. Both the upper nail pushing block groove 61 and the lower nail pushing block groove 62 facing each other form a nail pushing block track parallel to the nail shank track 20 and extending along the lengthwise direction of the nail magazine body 200.

The nails in nail strip are loaded in the nail head track 31 and the nail shank track 20 from the rear end of the nail magazine body 200. Both L shaped nail heads and T shaped nail heads are positioned in the nail head track 31, and nail shanks are positioned in the nail shank track 20. The nail head positioning protrusions 41, and 42 on both sides of the nails secure the positions of the nails such that every nails in the nail strip is lined up and in a consistent single file formation. The nail pushing block is placed behind the last nail of the nail strip. A spring acts on the nail pushing block such that the nails are pushed forward after the first nail on the nail strip near the nailing head is used by the nailing gun 100.

Figure 3B:
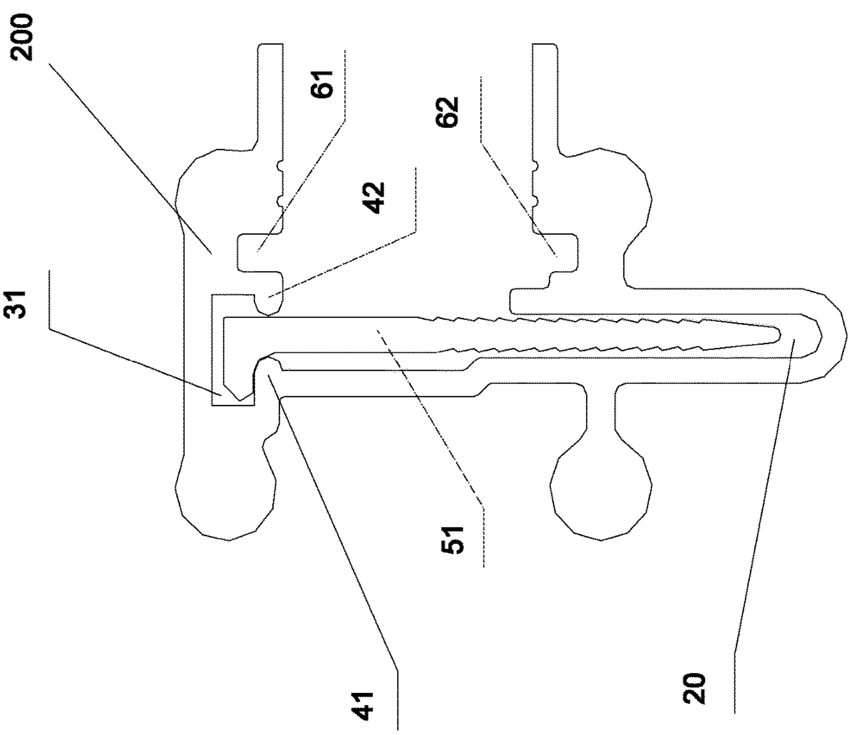
FIG. 3B shows a rear cross sectional view of the versatile nail magazine loaded with 16 gauge L shaped cleats.
Figure 3A:
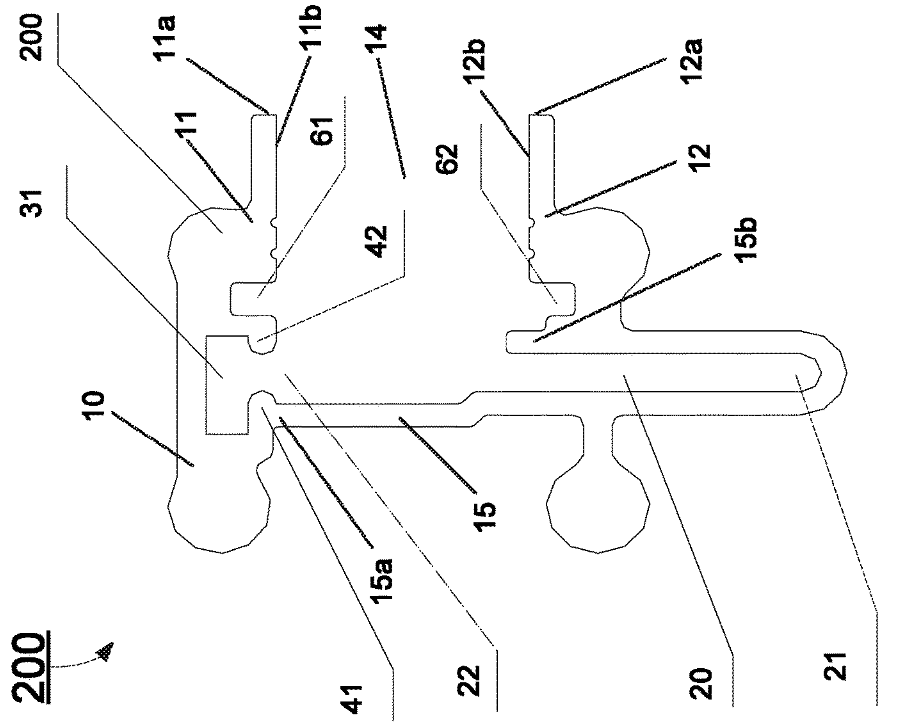
FIG. 3A shows a rear cross sectional view of a versatile nail magazine for a nailing gun.

In one embodiment, a nail strip containing 16 gauge L shaped cleats are loaded in the nail magazine body 200 of the versatile nail magazine 102 as shown in a cross sectional view of the nail magazine body 200 of the versatile nail magazine 102 in FIG. 3B. The nail heads of the 16 gauge L shaped cleats are positioned in the first nail head track 31.

Figure 3C:
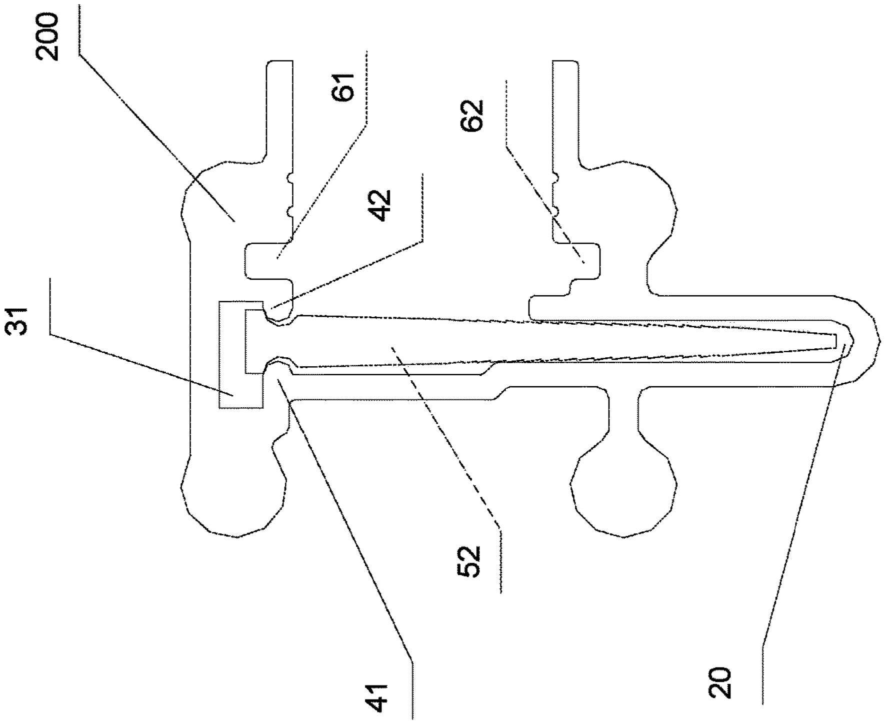
FIG. 3C shows a rear cross sectional view of the versatile nail magazine loaded with 16 gauge T shaped nail.

In another embodiment, a nail strip containing 16 gauge T shaped nails are loaded in the nail magazine body 200 of the versatile nail magazine 102 as shown in a cross sectional view of the nail magazine body 200 of the versatile nail magazine 102 in FIG. 3C. The nail heads of the 16 gauge T shaped nails are positioned in the first nail head track 31.

Figure 3D:
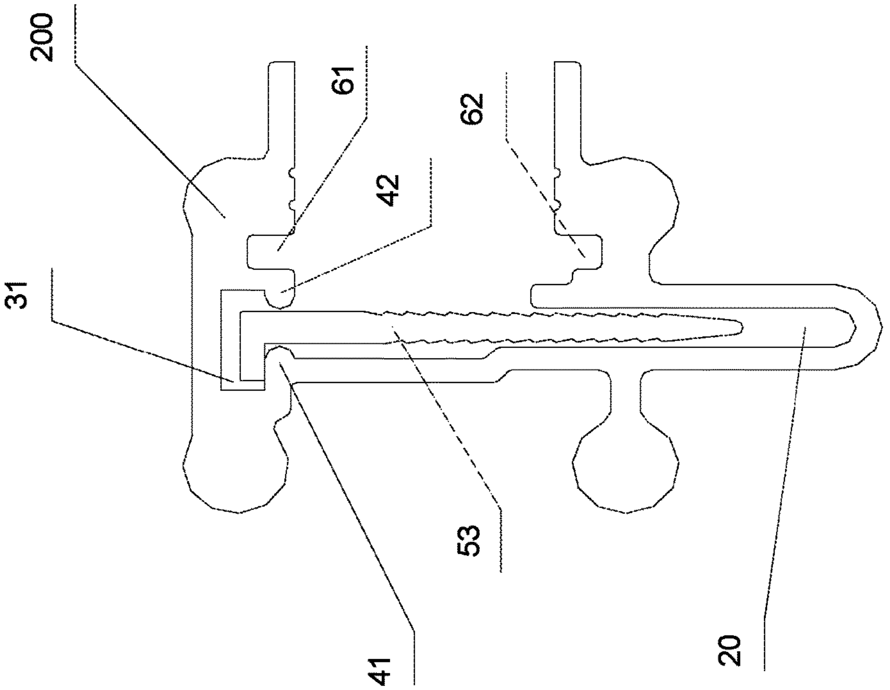
FIG. 3D shows a rear cross sectional view of the versatile nail magazine loaded with 18 gauge L shaped cleats according to certain embodiments of the present invention.

In yet another embodiment, a nail strip containing 18 gauge L shaped cleats are loaded in the nail magazine body 200 of the versatile nail magazine 102 as shown in a cross sectional view of the nail magazine body 200 of the versatile nail magazine 102 in FIG. 3D. The nail heads of the 18 gauge L shaped cleats are positioned in the first nail head track 31.

Other nails in different sizes, different shapes, different types, different gauges and different lengths may be loaded and used for the nailing gun 100 having the versatile nail magazine 102. Therefore, the present invention presented a true versatile nail magazine 102.

In another aspect, the present invention relates to another versatile nail magazine 102 for a nailing gun 100. In certain embodiments, the versatile nail magazine 102 includes an elongated nail magazine body 400. A cross sectional view of the nail magazine body 400 is shown in FIG. 4A for loading nails in nail strip. The nail magazine body 400 includes: a front end, an opposite, rear end, a nail shank track 20, a first nail head track 31, a second nail head track 32, and one or more nail head positioning protrusions 41, and 42. The front end of the nail magazine body 400 is connected to a nailing head 106 of the nailing gun 100 as shown in FIG. 1. The rear end of the nail magazine body 400 is used to load/reload various types of nails. The nail shank track 20 has a lower end 21, and an opposite, upper end 22. The first nail head track 31 is positioned on the upper end 22 of the nail shank track 20. The second nail head track 32 is positioned above the first nail head track 31 and connected to the first nail head track 31.

In certain embodiments, the first nail head track 31 has a rectangular shaped cross section, and substantially perpendicular to the nail shank track 20. The second nail head track 32 has an L shaped cross section, and one end of the second nail head track 32 is substantially perpendicular to the nail shank track 20, and the other end of the second nail head track 32 is substantially parallel to the nail shank track 20. The nail shank track 20 is connected to the first nail head track 31 through the nail head positioning protrusions 41, and 42, and further connected to the second nail head track 32. The nail head positioning protrusions 41, and 42 are disposed between the upper end 22 of the nail shank track 20 and the first nail head track 31 for securing the nails. The nail shank track 20, the first nail head track 31, and the second nail head track 32 extend lengthwise along the elongated nail magazine body 400. In one embodiment, the connected nail shank track 20 and the first nail head track 31 forms a T shaped cross sectional space for accommodating T shaped nails. In another embodiment, the connected nail shank track 20 and the first nail head track 31 forms an L shaped cross sectional space for accommodating short L shaped cleats, and the connected nail shank track 20 and the second nail head track 32 forms another L shaped cross sectional space for accommodating long L shaped cleats.

The nail head positioning protrusions 41, and 42 are positioned on both sides of the nail shank track 20 for securing the positions of the nails. In one embodiment, the nail head positioning protrusions 41, and 42 have rounded edge. The nails used by the embodiments of the versatile nail magazine 102 include at least: a T shaped nail, and an L shaped cleat in different gauges and lengths.

In certain embodiments, the nail magazine body 400 also includes an upper nail pushing block groove 61, a lower nail pushing block groove 62 for accommodating a nail pushing block. Both the upper nail pushing block groove 61 and the lower nail pushing block groove 62 form a nail pushing block track parallel to the nail shank track 20 and extending along the lengthwise direction of the nail magazine body 400.

The nails in nail strip are loaded in the first nail head track 31, the second nail head track 32, and the nail shank track 20 from the rear end of the nail magazine body 400. Nail heads of short L shaped cleats are positioned in the first nail head track 31, and nail heads of long L shaped cleats are positioned in the second nail head track 32. Nail heads of T shaped nails are positioned in the first nail head track 31. The nail shanks of both L shaped cleats and T shaped nails are positioned in the nail shank track 20. The nail head positioning protrusions 41, and 42 on both sides of the nails secure the positions of the nails such that every nails in the nail strip is lined up and in a consistent single file formation. The nail pushing block is placed behind the last nail of the nail strip. A spring acts on the nail pushing block such that the nails are pushed forward after the first nail on the nail strip near the nailing head is used by the nailing gun 100.

Figure 4B:
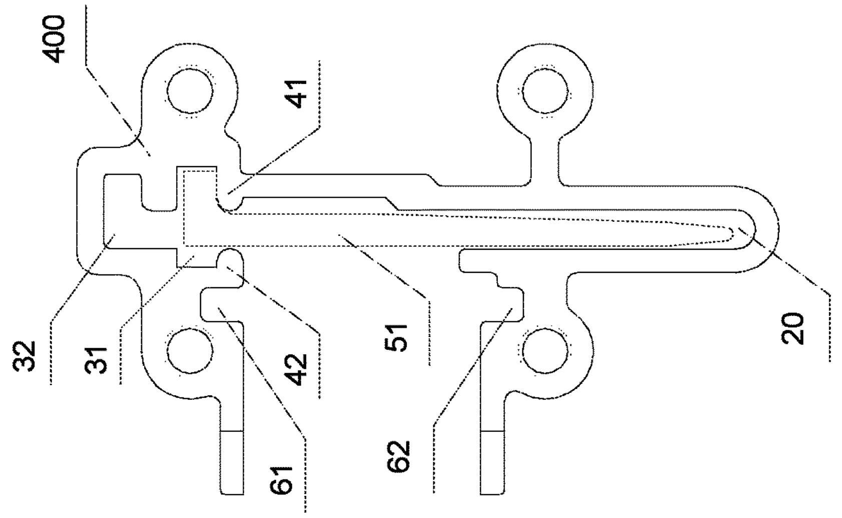
FIG. 4B shows a front cross sectional view of the versatile nail magazine loaded with 16 gauge L shaped cleats.
Figure 4A:
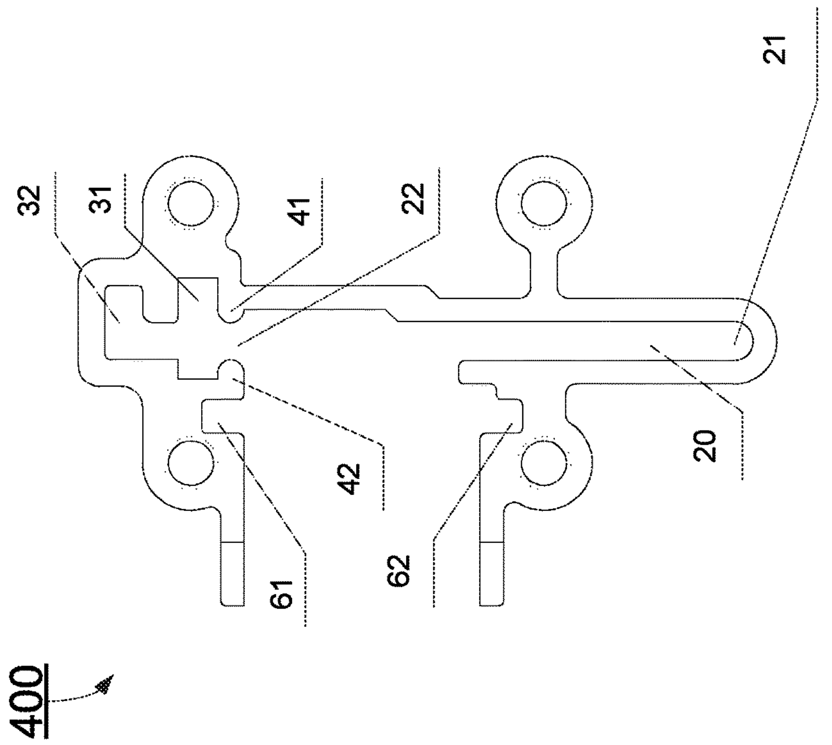
FIG. 4A shows a front cross sectional view of another versatile nail magazine for a nailing gun.
Figure 4D:
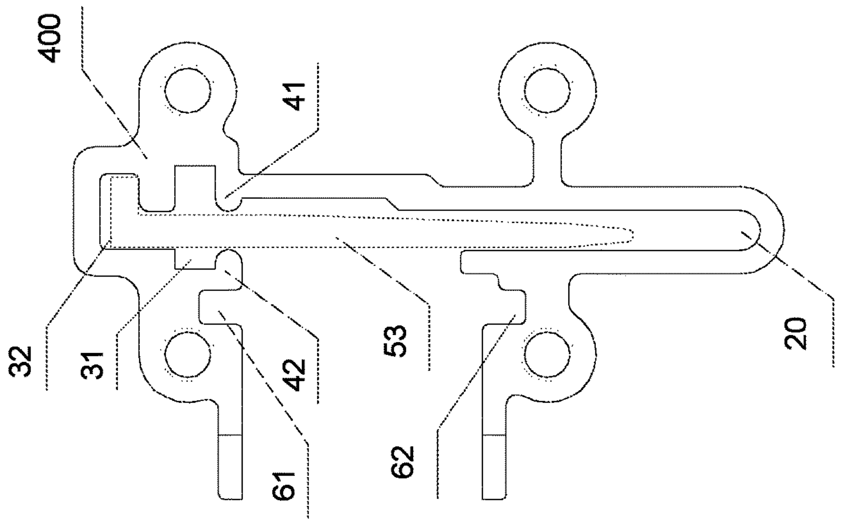
FIG. 4D shows a front cross sectional view of the versatile nail magazine loaded with 18 gauge L shaped cleats according to certain embodiments of the present invention.

In one embodiment, a nail strip containing 16 gauge short L shaped cleats are loaded in the nail magazine body 400 of the versatile nail magazine 102 as shown in a cross sectional view of the nail magazine body 400 of the versatile nail magazine 102 in FIG. 4B. The nail heads of the 16 gauge short L shaped cleats are positioned in the first nail head track 31.

Figure 4C:
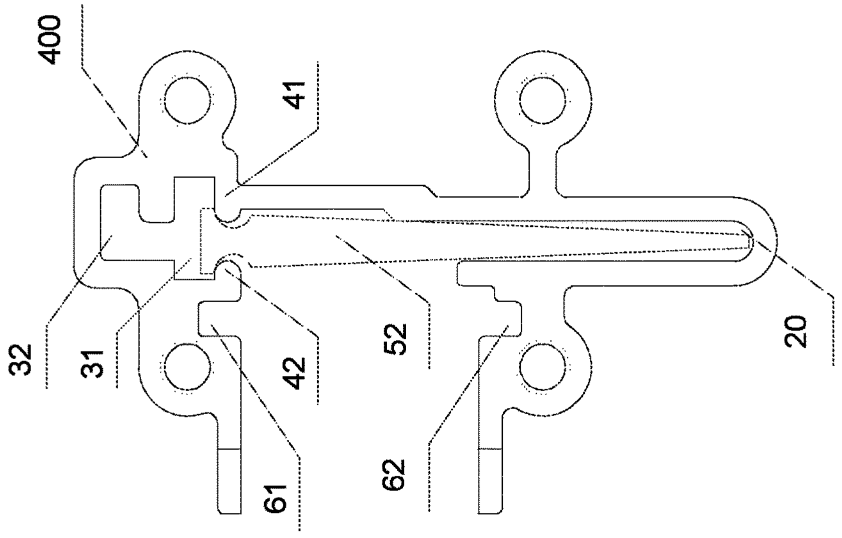
FIG. 4C shows a front cross sectional view of the versatile nail magazine loaded with 16 gauge T shaped nail.

In another embodiment, a nail strip containing 16 gauge T shaped nails are loaded in the nail magazine body 400 of the versatile nail magazine 102 as shown in a cross sectional view of the nail magazine body 400 of the versatile nail magazine 102 in FIG. 4C. The nail heads of the 16 gauge T shaped nails are positioned in the first nail head track 31

In yet another embodiment, a nail strip containing 18 gauge L shaped cleats are loaded in the nail magazine body 400 of the versatile nail magazine 102 as shown in a cross sectional view of the nail magazine body 400 of the versatile nail magazine 102 in FIG. 3D. The nail heads of the 18 gauge long L shaped cleats are positioned in the second nail head track 32.

Other nails in different sizes, different shapes, different types, different gauges and different lengths may be loaded and used for the nailing gun 100 having the versatile nail magazine 102. Therefore, the present invention presented a true versatile nail magazine 102.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims, the foregoing description and the exemplary embodiments described therein, and accompanying drawings.

What is claimed is:

1. A nail magazine for a nailing gun, comprising:

an elongated nail magazine body for loading a plurality of nails, wherein the nail magazine body includes:

a front end connected to a nailing head of the nailing gun, and an opposite, rear end for reloading the plurality of nails;

a top portion having a first nail head track defined therein and a first flange extending widthwise from the nail head track; a sidewall having a first end and a second end and extending vertically from the top portion in a cross-sectional U-like shape to define a nail shank track having a lower end at a bottom of the cross-sectional U-like shape of the sidewall, and an opposite, upper end at the first nail head track and the first end of the sidewall; and a second flange extending widthwise from the second end of the sidewall such that the first flange and the second flange define an opening therebetween to communicate with the nail shank track and the first nail head track, wherein the first flange has a widthwise edge and an inner surface facing the opening and the second flange has a widthwise edge and an inner surface facing the opening, wherein the widthwise edges of the first flange and the second flange are vertically aligned with each other, and the inner surfaces of the first flange and the second flange are parallel to each other and perpendicular to the nail shank track;

and one or more nail head positioning protrusions disposed in the top portion and between the upper end of the nail shank track and the first nail head track for securing the plurality of nails; and an upper nail pushing block groove defined in the first flange and facing the opening, and a lower nail pushing block groove defined in the second flange, facing the opening, and corresponding to the upper nail pushing block groove such that the upper nail pushing block groove and the lower nail pushing block groove form a nail pushing block track parallel to the nail shank track, wherein the nail shank track, the first nail head track, the nail pushing block track and the opening extend lengthwise along the elongated nail magazine body.

2. The nail magazine of claim 1, wherein the first nail head track has a rectangular shaped cross section, and substantially perpendicular to the nail shank track.

3. The nail magazine of claim 2, wherein the nail shank track and the first nail head track forms T shaped cross sectional space for accommodating T shaped nails.

4. The nail magazine of claim 2, and the nail shank track and the first nail head track forms an L shaped cross sectional space for accommodating L shaped cleats.

5. The nail magazine of claim 1, wherein the nail head positioning protrusions are disposed on both sides of the nail shank track for securing the positions of the plurality of nails.

6. The nail magazine of claim 1, wherein the nail head positioning protrusions have rounded edge.

7. The nail magazine of claim 1, wherein the plurality of nails comprises at least one of: a T shaped nail, and an L shaped cleat.

8. The nail magazine of claim 1, further comprising:

a second nail head track disposed above the first nail head track and connected to the first nail head track, wherein the second nail head track extends lengthwise along the elongated nail magazine body.

9. The nail magazine of claim 8, wherein the first nail head track has a rectangular shaped cross section, and substantially perpendicular to the nail shank track, and wherein the second nail head track has an L shaped cross section, and one end of the second nail head track is substantially perpendicular to the nail shank track, and the other end of the second nail head track is substantially parallel to the nail shank track.

10. The nail magazine of claim 8, wherein the nail shank track and the first nail head track forms an L shaped cross sectional space for accommodating short L shaped cleats, and the connected nail shank track and the second nail head track forms another L shaped cross sectional space for accommodating long L shaped cleats.

* * * * *